United States Patent
Jarry et al.

(10) Patent No.: US 11,066,319 B2
(45) Date of Patent: *Jul. 20, 2021

(54) METHOD AND FACILITY FOR MANUFACTURING A FIBERGLASS MATERIAL

(71) Applicant: L'Air Liquide, Societe Anonyme pour l'Etude et l'Exploitation des Procedes Georges Claude, Paris (FR)

(72) Inventors: Luc Jarry, Beaufai (FR); Youssef Joumani, Crespieres (FR); Gregoire Beasse, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 64 days.

This patent is subject to a terminal disclaimer.

(21) Appl. No.: 15/748,896

(22) PCT Filed: Jul. 28, 2016

(86) PCT No.: PCT/FR2016/051960
§ 371 (c)(1),
(2) Date: Jan. 30, 2018

(87) PCT Pub. No.: WO2017/017382
PCT Pub. Date: Feb. 2, 2017

(65) Prior Publication Data
US 2019/0023599 A1    Jan. 24, 2019

(30) Foreign Application Priority Data

Jul. 30, 2015 (FR) ...................................... 1557344

(51) Int. Cl.
*C03B 5/237* (2006.01)
*C03B 37/04* (2006.01)
(Continued)

(52) U.S. Cl.
CPC ............ *C03B 5/237* (2013.01); *C03B 5/2353* (2013.01); *C03B 37/04* (2013.01); *C03B 37/06* (2013.01);
(Continued)

(58) Field of Classification Search
None
See application file for complete search history.

(56) References Cited

U.S. PATENT DOCUMENTS

| | | |
|---|---|---|
| 2,633,428 A | 3/1953 | Klug |
| 2,665,125 A | 1/1954 | Klug |

(Continued)

FOREIGN PATENT DOCUMENTS

| | | |
|---|---|---|
| DE | 10 2013 110283 | 3/2015 |
| EP | 0 500 923 | 9/1992 |

(Continued)

OTHER PUBLICATIONS

International Search Report and Written Opinion for PCT/FR2016/051960, dated Oct. 27, 2016.

(Continued)

*Primary Examiner* — Lisa L Herring
(74) *Attorney, Agent, or Firm* — Christopher J. Cronin

(57) ABSTRACT

The invention relates to a method and facility for manufacturing a fiberglass material, in which melted glass is produced in a melting furnace heated via combustion of a fuel with an oxygen-rich oxidant. The fumes generated are used to preheat a combustion reagent in two steps: a first step in which air is heated via heat exchange with the fumes, and a second step in which the combustion reagent is preheated via heat exchange with the hot air. The air is then used in the method for converting the melted glass into a fiberglass material.

11 Claims, 1 Drawing Sheet

(51) Int. Cl.
*C03B 37/06* (2006.01)
*C03B 5/235* (2006.01)
*C03B 37/14* (2006.01)
*C03C 25/14* (2018.01)

(52) U.S. Cl.
CPC .............. *C03B 37/14* (2013.01); *C03C 25/14* (2013.01); *Y02P 40/50* (2015.11)

(56) References Cited

U.S. PATENT DOCUMENTS

| | | |
|---|---|---|
| 2,845,364 A | 7/1958 | Waggoner |
| 2,970,934 A | 2/1961 | May |
| 3,012,845 A | 12/1961 | Lotz |
| 2003/0041625 A1* | 3/2003 | Ruid ................ C03B 37/04 65/444 |
| 2007/0137259 A1* | 6/2007 | Borders ............ C03B 37/065 65/454 |
| 2010/0162772 A1 | 7/2010 | McGinnis et al. |
| 2011/0111198 A1* | 5/2011 | Letourmy .......... C03B 37/04 428/220 |
| 2012/0132851 A1* | 5/2012 | Blanchard ........ A61L 9/014 252/182.12 |
| 2018/0230047 A1* | 8/2018 | Jarry .................. C03B 37/04 |
| 2019/0003092 A1* | 1/2019 | Jarry .................. C03B 37/04 |

FOREIGN PATENT DOCUMENTS

| | | |
|---|---|---|
| EP | 1 338 848 | 8/2003 |
| EP | 2 551 243 | 1/2013 |
| FR | 3 000 174 | 6/2014 |
| FR | 3 000 175 | 6/2014 |
| FR | 3 015 469 | 6/2015 |
| FR | 3 015 635 | 6/2015 |
| FR | 3 015 636 | 6/2015 |
| FR | 3 015 637 | 6/2015 |
| WO | WO 2013/010722 | 1/2013 |

OTHER PUBLICATIONS

International Search Report and Written Opinion for PCT/FR2016/051961, dated Feb. 1, 2018.
International Search Report and Written Opinion for PCT/FR2016/051962, dated Oct. 27, 2016.

* cited by examiner

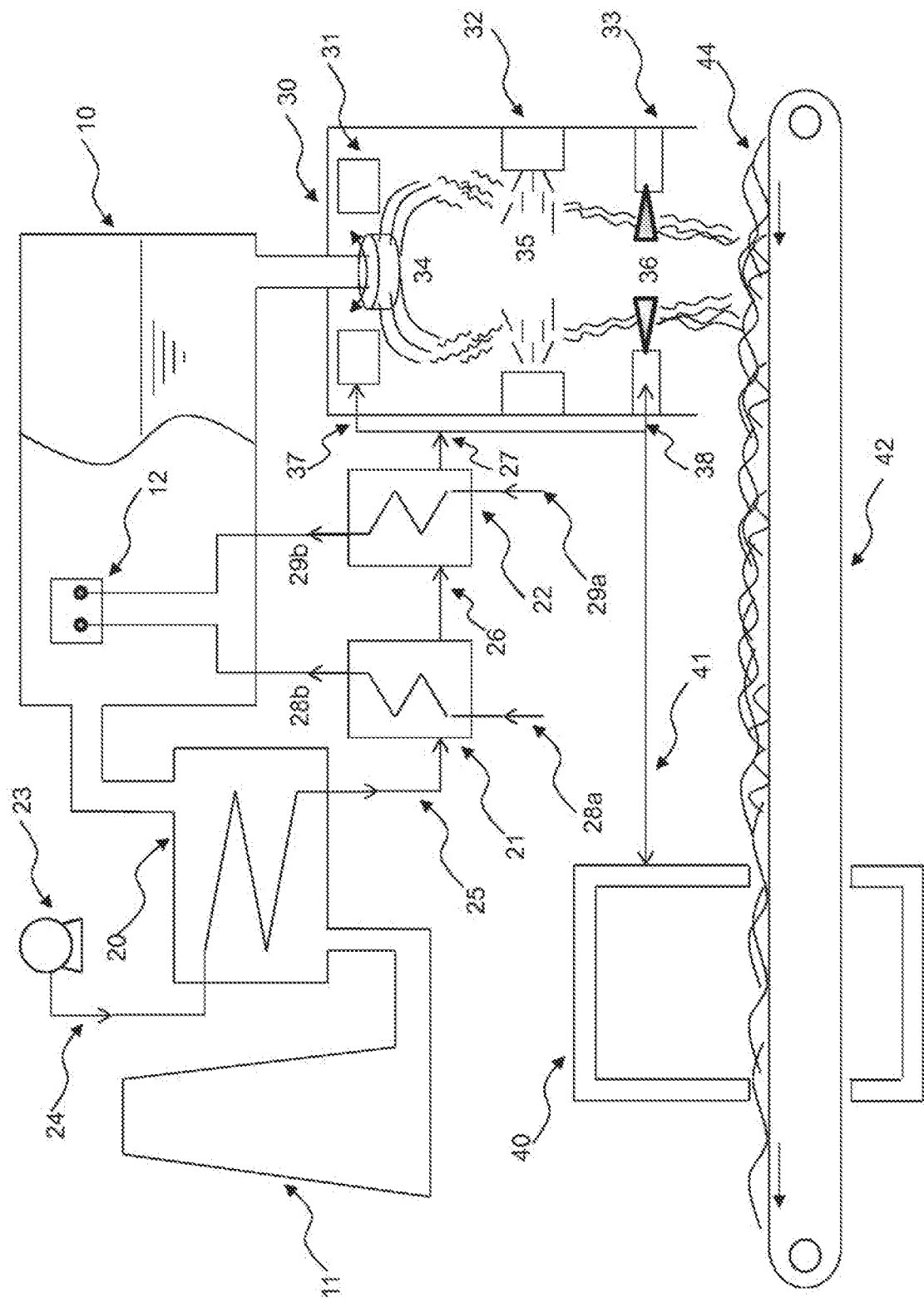

METHOD AND FACILITY FOR MANUFACTURING A FIBERGLASS MATERIAL

CROSS-REFERENCE TO RELATED APPLICATIONS

This application is a § 371 of International PCT Application PCT/FR2016/051960, filed Jul. 28, 2016, which claims § 119(a) foreign priority to French patent application FR 1557344, filed Jul. 30, 2015.

BACKGROUND

Field of the Invention

The invention relates to the manufacture of glass fiber products.

The term "glass fiber product" is understood to mean glass fibers as such and also products containing them.

Related Art

It is known to manufacture glass fibers by a process comprising the spinning of streams of glass coming from a melting furnace by means of a bushing, the attenuation of the streams thus obtained and the collecting of the attenuated glass streams thus obtained.

A distinction is made between:

a) mechanical attenuation by means of a winder or analogous winding member, b) attenuation by gas friction by means of one or more gas attenuation currents, and c) centrifugal attenuation by means of a centrifuge.

Centrifugal attenuation is in industrial practice generally combined with attenuation by gas friction.

According to a first embodiment of the attenuation by gas friction, also known as flame attenuation, the glass stream is cooled and solidifies, with a glass rod being obtained. The glass rod is introduced into a flame. The end of the rod is thus melted and subsequently attenuated by the combustion gases of the flame, so as to form one or more glass wool filaments. Flame attenuation makes it possible to produce very fine glass fibers but exhibits the disadvantage of consuming a great deal of energy, in particular because of the twofold melting of the glass. Flame attenuation is generally used for products of high added value.

According to a second process of attenuation by gas friction, which is slightly less energy-consuming, also known as gas attenuation, the molten glass stream is directly, that is to say without passing through a solidified phase, impacted by one or more currents or jets of attenuation gas, such as a current of steam or of combustion gas.

According to a known process combining centrifugal attenuation and attenuation by gas friction, the molten glass stream is introduced into a centrifuge and is converted by centrifugal force into a large number of molten glass filaments. Said filaments are subsequently attenuated by a cylindrical curtain of attenuation gas which surrounds the centrifuge. The latter process provides most of the production of glass fibers for insulation.

In order for the attenuation by gas friction to be effective, the viscosity of the glass during the attenuation has to be sufficiently low, which in its turn requires that the attenuation gas be very hot and makes it possible to bring the glass to and/or maintain it at a high temperature corresponding to a low viscosity.

SUMMARY OF THE INVENTION

It is an aim of the present invention to provide a process for the manufacture of glass fiber products which is optimized as less energy-consuming.

An aim of the present invention is more particularly to provide such an optimized manufacturing process without a negative effect on the quality of the glass fiber products.

According to the present invention, this is produced in particular by better energy integration of the phase of molten glass production and the fiberizing phase.

Another aim of the present invention is to provide a suitable plant for the implementation of such an optimized process.

In the manufacturing process according to the invention, molten glass is converted into a glass fiber product. This conversion comprises the following stages:

spinning the molten glass into at least one stream, attenuating the at least one stream into one or more filaments, and collecting the filament or filaments.

The conversion of molten glass into glass fiber product optionally also comprises at least one of the following stages:

sizing the filament or filaments upstream of their collection, drying the filament or filaments, application of adhesive to the filament or filaments and crosslinking of the collected adhesive-treated filament or filaments, and texturing of the filament or filaments or of strands containing them.

The sizing of filaments is a common practice often essential in the manufacture of glass fiber products, such as, in particular, glass strands, glass fabrics and reinforcing fibers.

This is because the sizing lubricates the filaments and protects them (in particular from abrasion) during the strand formation (manufacture of strands from fibers), during the throwing or twisting, during the texturing, during the knitting or the weaving, and the like.

The application of adhesive to and the crosslinking of the adhesive-treated filaments is a common practice in the manufacture of insulation products and in particular of thermal or acoustic insulation products, and also the manufacture of fire-protection products. The application of adhesive and the crosslinking can also occur in the manufacture of nonwoven glass fiber fabrics.

The drying of the filaments can in particular be of use in order to fix the sizing agent or the adhesive binder to the filaments by evaporation or volatilization of water or of another solvent present in the sizing agent/the binder.

The texturing of the filaments or strands containing them is a common practice in the manufacture of fiberglass textile products, such as in particular knitted, woven or nonwoven glass fiber fabrics. The texturing makes it possible to increase the volume and sometimes the elasticity of the filaments or strands.

The molten glass to be converted into the glass fiber product is produced in a melting furnace heated by combustion of a fuel with a rich oxidizer. In the present context, the term "rich oxidizer" is understood to mean a gas having an oxygen content of 80 vol % to 100 vol %. The combustion generates heat for the melting and flue gases. The flue gases generated are discharged from the melting furnace at a temperature between 1000° C. and 1600° C.

The combustion with a rich oxidizer heats the furnace with a high efficiency.

It should be noted that the heating of the furnace by combustion of a fuel with a rich oxidizer does not exclude the furnace from also being heated by additional means, such as, for example, electrodes.

According to the invention, a first energy optimization of the manufacturing process is carried out:

in that air is heated by heat exchange with discharged flue gases in a heat-exchange assembly with hot air being obtained, in that a reactant is preheated by heat exchange with the hot air in the heat-exchange assembly with the production of preheated reactant and of moderated air at a temperature between 200° C. and 500° C., and in that the preheated reactant is used as combustion reactant in the furnace.

The reactant is chosen from rich oxidizers and gaseous fuels. According to a preferred embodiment, a rich oxidizer is preheated before it is used in the furnace.

It is also possible to preheat both a rich oxidizer and a gaseous fuel before they are used in the furnace. In this case, the preheating of the two reactants can be carried out in series or in parallel.

A second energy optimization of the manufacturing process is carried out in that the moderated air resulting from the heat-exchange assembly is employed during the conversion of the molten glass into a glass fiber product, so as to make use of the residual heat still present in this moderated air.

This moderated air can be employed in one or more stages of the conversion of the molten glass.

Thus, according to a preferred embodiment of the invention, moderated air can be employed during the attenuation of the stream. In this case, moderated air can be used for the production of one or more attenuation gas currents or for the production of one or more attenuation flames.

When the conversion comprises a stage of sizing the filament or filaments, moderated air can be employed during this sizing stage, for example by using moderated air as spraying agent for the sizing agent.

When the conversion comprises a stage of application of adhesive to the filament or filaments by spraying, moderated air can be used as spraying agent for an adhesive binder.

When the conversion comprises a stage of drying the filament or filaments, moderated air can be employed as drying agent in contact with the filament or filaments.

When the conversion comprises a texturing stage, moderated air can be used as texturing gas current and more particularly as texturing air turbulent jet.

Moderated air resulting from the heat-exchange assembly can be used in one of the abovementioned stages or in several of said stages.

According to the present invention, an energy synergy is thus produced between, on the one hand, the melting and, on the other hand, the conversion of the molten glass downstream of the melting, and in that moderated air resulting from the heat-exchange assembly is employed during the conversion of the molten glass into glass fiber product.

In the present context, "heat exchange" between two fluids of different temperatures is understood to mean the transfer of heat or of thermal energy from one of the two fluids (hotter fluid) toward the other of the two fluids (cooler fluid) through one or more walls without the two fluids coming into direct contact or mixing.

"Heat exchanger" or "exchanger" is understood to mean a plant or a device in which two fluids of different temperatures move in separate chambers or circuits without direct contact or mixing between the two fluids, in which plants or devices heat is transmitted from the hottest fluid to the coolest fluid through one or more walls separating the two chambers or circuits.

The term "filament" refers to an attenuated stream.

In order to improve the homogeneity of the glass stream and thus the homogeneity and the quality of the filament or filaments obtained by attenuation of the stream, the molten glass can be refined before the spinning.

The melting and the refining of the glass can then take place in one and the same melting/refining chamber of the furnace, the refining zone then being located downstream of the melting zone and upstream of the molten glass outlet in the direction of flow of the glass.

The melting and the refining can also take place in separate chambers of the furnace, the refining chamber being located downstream of the melting chamber. It is then considered that the furnace encompasses these two chambers.

According to one embodiment, the molten glass is extruded immediately at the outlet of the furnace, for example through a bushing located at the molten glass outlet of the furnace.

According to an alternative embodiment, the molten glass resulting from the furnace is transported by a canal from the furnace, that is to say from a molten glass outlet of the furnace, toward a bushing for the spinning of the molten glass into stream(s).

In the present context, the term "bushing" refers to any spinning device which makes it possible to produce one or more molten glass streams from a molten glass bath. The bushing can be provided in several embodiments, such as a pierced metal plate. The bushing can itself be heated, for example electrically, in order to prevent the extrusion/spinning perforation or perforations from being partially or completely blocked by (partially) solidified, indeed even crystallized, glass.

The heat-exchange assembly advantageously comprises a primary exchanger and a secondary exchanger. Air is then heated by heat exchange with flue gases discharged from the melting furnace in the primary exchanger and the reactant is preheated in the secondary exchanger by heat exchange with the hot air resulting from the primary exchanger.

According to one embodiment of the process, the heat-exchange assembly comprises a primary exchanger and a secondary exchanger, air being heated by heat exchange with flue gases discharged from the furnace in the primary exchanger, with hot air at a temperature between 500° C. and 800° C. being obtained, and the combustion reactant is preheated in the secondary exchanger by heat exchange with hot air resulting from the primary exchanger.

As indicated above, moderated air is advantageously used in a gas friction attenuation stage and more particularly for the production of one or more attenuation gas currents.

According to one such embodiment, the attenuation is a flame attenuation.

In this case, this flame attenuation is advantageously carried out by means of an attenuation flame generated by combustion of a fuel with moderated air resulting from the heat-exchange assembly.

The residual heat of the moderated air makes it possible to achieve a significant saving in energy in this process known as being energy consuming.

According to another embodiment, the attenuation is a gas attenuation. In this case, use is advantageously made of an attenuation gas jet generated by combustion of a fuel with moderated air resulting from the heat-exchange assembly.

In this case again, it is possible to achieve a significant saving in energy by virtue of the residual heat of the moderated air which makes it possible to achieve a significant saving in energy.

As described above, the attenuation can also be a centrifugal attenuation followed by a gas attenuation. According to a preferred embodiment of the invention, the centrifugal attenuation is followed by a gas attenuation by means of an attenuation gas jet generated by combustion of fuel with moderated air resulting from the heat-exchange assembly.

The attenuation of the stream or streams preferably takes place inside a hood, so as to exert better control over the attenuation conditions and in particular the attenuation temperature, and also, in particular when the stream is attenuated into several filaments, to prevent or to limit the flight of filaments. The filament or filaments can also be sized and/or treated with adhesive and/or dried inside this hood. When the filament or filaments are collected on a conveyor, the latter is then advantageously in the bottom of the hood.

The process according to the invention is of use in the production of a great range of glass fiber products, and in particular in the production of products such as reinforcing fibers or strands, reinforcing fabrics, textile fabrics, thermal insulation products, acoustic insulation products or fire-protection products. When the glass fiber product is a fabric, this fabric can be a knitted fabric, a woven fabric or a nonwoven fabric.

The present invention also relates to a plant capable of being used in the implementation of the manufacturing process according to the invention.

The plant comprises a glass melting furnace and a conversion unit for the conversion of molten glass into a glass fiber product.

The furnace of the plant is intended to produce molten glass from solid materials. It comprises a molten glass outlet, an outlet for flue gases and at least one burner for the combustion of a fuel with a rich oxidizer, that is to say an oxidizer having an oxygen content of 80 vol % to 100 vol %.

The furnace generally comprises several burners of this type.

As already indicated above, the furnace can also comprise other heating devices complementing the at least one above-mentioned burner.

The conversion unit of the plant comprises a device, known as bushing, for the spinning of molten glass resulting from the melting furnace into at least one stream, the bushing being more particularly connected fluidically to the molten glass outlet of the furnace.

The transformation unit also comprises an attenuation device for the attenuation of at least one stream resulting from the bushing into one or more filaments, and also a collector for the collecting of the filament or filaments resulting from the attenuation device.

The transformation unit also optionally comprises one or more of the following devices:
- a sizer for the sizing of the filament or filaments upstream of the collector,
- an adhesive applicator for the application of adhesive (a binder) to the filament or filaments and a crosslinking chamber for the crosslinking of the adhesive-treated filament or filaments, the crosslinking chamber being located downstream of the collector and often being referred to as crosslinking oven,
- a dryer for the drying of the filament or filaments in particular of the sized or adhesive-treated filament or filaments, and
- a chamber for texturing the filament or filaments or strands containing them.

The attenuation device of the plant is advantageously appropriate for the implementation of any one of the attenuation processes mentioned above. Thus, the attenuation device can comprise:
- one or more mechanical attenuation devices, such as winders or analogous appliances, or
- one or more burners for flame attenuation, or
- one or more gas current generators for the gas attenuation, it being known that said gas current generators can be burners generating combustion gas currents used as attenuation gas currents.

The attenuation device can also comprise a combination of a centrifuge for the centrifugal attenuation with one or more gas current generators for the gas attenuation of the streams resulting from the centrifuge, it being possible for said generators, as indicated above, to be burners.

When the attenuation device produces one or more continuous filaments, the collector can be a winder or another device for the winding of the filament or filaments. It is thus possible to use a winder both as mechanical attenuation device and collector.

The collector can also be a conveyor on which the filament or filaments are collected. Such a conveyor is particularly indicated when the stream or streams are attenuated to give a large number of filaments and in particular to give a large number of short filaments, such as employed for the manufacture of thermal insulation and/or acoustic insulation and/or fire-protection products.

The plant according to the invention is designed so as to make possible a high energy efficiency of the melting furnace and also an energy synergy between the melting furnace and the conversion unit located downstream of the furnace.

To this end, the plant comprises a heat-exchange assembly for the heating of air by heat exchange with flue gases discharged from the melting furnace and for the preheating of a combustion reactant by heat exchange with the hot air thus obtained.

Preheated combustion reactant and moderated air are thus obtained. The heat-exchange assembly is fluidically connected to a source of air, to the flue gas outlet of the furnace and to a source of combustion reactant, the latter source being a source of rich oxidizer or a source of gaseous fuel.

The heat-exchange assembly exhibits a moderated air outlet and a preheated reactant outlet.

The preheated combustion reactant outlet of the heat-exchange assembly is fluidically connected to one or more burners of the melting furnace in order to make possible the use of the preheated reactant as combustion reactant in the melting furnace.

According to the invention, the moderated air outlet of the heat-exchange assembly is fluidically connected to at least one of the following devices:
- the attenuation device: for the production of an attenuation flame or of a gas attenuation current by means of moderated air resulting from the heat-exchange assembly;
- the sizer, if present: for the use of moderated air resulting from the heat-exchange assembly as spraying agent for a sizing agent;

the adhesive applicator, if present: for the use of moderated air resulting from the heat-exchange assembly as agent for spraying the binder;

the dryer, if present: for the use of moderated air resulting from the heat-exchange assembly as drying agent in contact with the filament or filaments;

the texturing chamber, if present: for the use of moderated air resulting from the heat-exchange assembly as texturing gas current and more particularly as texturing air turbulent jet.

In the present context, two elements are "fluidically connected" when they are connected by a pipe or a pipeline so as to make possible the flow of a fluid from one of the two elements toward the other of the two elements through this pipe or pipeline.

The source of air can, for example, be an air blower.

The heat-exchange assembly preferably makes possible at least the preheating of a rich oxidizer, indeed even the preheating of a rich oxidizer and of a gaseous fuel.

The source of rich oxidizer can, for example, be a unit for the separation of the gases of the air or a pipeline or tank for a liquefied rich oxidizer.

The heat-exchange assembly usefully comprises a first heat exchanger, referred to as "primary exchanger" or "primary heat exchanger", for heat exchange between the flue gases discharged from the furnace and the air to be heated, and also a second heat exchanger, referred to as "secondary heat exchanger" or "secondary exchanger", for heat exchange between the hot air resulting from the primary exchanger and the reactant to be preheated.

In this case, the primary exchanger is fluidically connected to the source of air and to the flue gas outlet of the furnace. The secondary exchanger is fluidically connected to the source of reactant to be preheated. The secondary exchanger also exhibits the preheated combustion reactant outlet and the moderated air outlet.

According to an embodiment which makes possible the preheating of a rich oxidizer and of a gaseous fuel, the heat-exchange assembly comprises a first and a second secondary exchanger, the first secondary exchanger being fluidically connected to a source of rich oxidizer and the second secondary exchanger being fluidically connected to a source of a gaseous fuel.

These two secondary exchangers can be positioned in series or in parallel with respect to the flow of the hot air resulting from the primary exchanger.

The furnace can be a melting/refining furnace as described above.

The bushing can be located at the molten glass outlet of the melting furnace. The plant can also comprise a pipeline for the transportation of molten glass from this molten glass outlet toward the bushing.

According to a preferred embodiment of the plant according to the invention, the attenuation device comprises an attenuation burner for producing an attenuation flame or for producing an attenuation gas current by the combustion of a fuel with moderated air resulting from the heat-exchange assembly, said attenuation burner then being fluidically connected with the moderated air outlet of the heat-exchange assembly.

According to a particularly preferred embodiment, the attenuation device comprises a centrifuge for the centrifugal attenuation of the stream or streams, and also an attenuation burner for the gas attenuation of the filaments resulting from the centrifuge.

In this case, the attenuation burner is advantageously annular, capable of generating an attenuation gas current around the centrifuge and fluidically connected to the moderated air outlet of the heat-exchange assembly for the provision of moderated air as oxidant to the attenuation burner.

The plant according to the invention usefully comprises a hood surrounding the attenuation device. This hood can also surround one or more of the following devices: the sizer, the adhesive applicator and the dryer. When the plant is intended to produce a large number of short filaments, the hood makes it possible to prevent or to limit filaments from taking flight during the operation of the plant. The hood also more generally makes it possible to better control the attenuation conditions, indeed even the drying, sizing and/or application of adhesive conditions.

When the plant is intended to produce a large number of short filaments, the collector is preferably located below or at the bottom of the hood.

The plant according to the invention can be a plant for the production of reinforcing fibers or strands, reinforcing or textile knitted, woven or nonwoven fabrics, or also acoustic insulation and/or thermal insulation and/or fire-protection products.

BRIEF DESCRIPTION OF THE FIGURES

FIG. 1 is a diagrammatic representation of a process and of a plant for the manufacture of a thermal insulation/acoustic insulation and/or fire-protection fleece.

DETAILED DESCRIPTION OF THE INVENTION

The plant illustrated in FIG. 1 comprises a glass melting furnace 10 heated by a number of burners 12 (just one burner is shown in the FIGURE).

To this end, rich oxidizer 28a, typically a gas containing between 80 vol % and 100 vol % of oxygen, and a gaseous fuel 29a, such as natural gas, are supplied to said burners 12.

The flue gases or combustion gases generated by the combustion of the fuel 29a with the rich oxidizer 28a are discharged from the melting furnace 10 and introduced into a primary exchanger 20 in order to heat the compressed or uncompressed air 24 supplied by the compressor or a fan 23.

Downstream of the primary exchanger 20, the flue gases are discharged through the chimney 11, typically after having been subjected to a treatment for removal of pollutants and dust.

The hot air 25 resulting from the primary exchanger 20 is introduced into a first secondary exchanger 21 for the preheating of the rich oxidizer 28a and subsequently, in the form of partially moderated air 26, into a second secondary exchanger 22 for the preheating of the gaseous fuel 29a.

The preheated rich oxidizer 28b resulting from the first secondary exchanger 21 and the preheated gaseous fuel 29b resulting from the second secondary exchanger 22 are supplied to the burners 12 as combustion reactants.

This makes possible a first very significant saving in energy in the manufacturing process according to the invention.

The molten glass resulting from the melting furnace 10 is introduced in the form of a stream of molten glass into a centrifuge 34 and the filaments resulting from the centrifuge 34 are attenuated by means of an annular current of attenuation gas generated by the crown-shaped attenuation burner 31.

The filaments resulting from this attenuation assembly are treated with adhesive by the sprayers 32 of binder 35 and subsequently dried by gaseous drying agent jets 36 injected by the dryers 33.

The stages of attenuation, of application of adhesive and of drying are carried out in a controlled environment inside a hood 30.

The dried adhesive-treated filaments are collected in the form of a fleece 44 of filaments by a conveyor 42 in the bottom of the hood 30.

The conveyor 42 brings the fleece 44 toward a crosslinking oven 40 in which the adhesive-treated filaments are crosslinked under the effect of heat and are thus board together.

Downstream of the oven 40, the rigid, semirigid or flexible fleece is shaped and wrapped up.

According to the invention, the residual heat present in the moderated air 27 resulting from the secondary exchangers 21, 22 is made use of in order to improve the energy efficiency of the conversion process downstream of the melting furnace 10.

Thus, a portion of the moderated air 27 is introduced as oxidant into the attenuation burner 31 in order to more efficiently generate the attenuation gas current.

Another portion of the moderated air 27 is used as drying gas 36 by the dryers 33, the residual heat of the moderated air 27 making it possible to accelerate the drying of the filaments.

In the illustrated embodiment, a final portion of the moderated air 27 is introduced into the crosslinking oven and sucked through the fleece 44 inside the oven in order to promote the crosslinking of the filaments in the fleece 44.

The advantages of the present invention are illustrated in the example below.

The melting furnace produces 100 tpd of insulation fiber from 5 MW of thermal power. A contribution of electrical energy of the order of 1 to 5 MWe may be necessary according to the production conditions. The combustion flue gases exit at 1350° C. and can be cooled by dilution with ambient air to reach a temperature of 1200° C. at the inlet of the recuperator.

The 500 Sm³/h of natural gas (95% methane, 2% butane, 2% propane and 1% $CO_2$) are preheated to 450° C. The 1000 Sm³/h of oxygen are preheated to 550° C.

In order to preheat these gases, close to 4000 Sm³/h are necessary. Heated to 650° C. in the primary exchanger, the air is cooled to 400° C. at the outlet of the secondary exchanger.

This moderated air, which has an energy value of 530 kW, is subsequently conveyed, in a pipe preferably made of stainless steel:

on the one hand, toward the generator of hot attenuation gases surrounding the attenuation centrifuges on the other hand, toward the battery of drying gas guns.

By virtue of this hot air, the amount of fuel consumed during the attenuation is significantly reduced (10%).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising," "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for manufacturing a glass fiber product in which molten glass is converted into a glass fiber product, said process comprising the steps of:

producing molten glass in a melting furnace heated by combustion of a fuel with a rich oxidizer having an oxygen content of 80 vol % to 100 vol %, with generation of heat and flue gases, said generated flue gases being discharged from the melting furnace at a temperature between 1000° C. and 1600° C.;

heating air by heat exchange with the discharged flue gases in a primary heat exchanger to produce hot air, the hot air being at a temperature between 500° C. and 800° C.; and before the rich oxidizer and the fuel are combusted, preheating the rich oxidizer and/or the fuel by heat exchange with the hot air in a secondary heat exchanger to correspondingly produce preheated rich oxidizer and/or preheated fuel and also moderated air that is obtained from the hot air, the moderated air being at a temperature between 200° C. and 500° C., the molten glass being converted into a glass fiber product by:

spinning the molten glass into at least one stream;

attenuation of the at least one stream into one or more filaments;

collecting the filament or filaments;

optionally sizing the filament or filaments upstream of their collection;

optionally applying adhesive to the filament or filaments before or after their collection, followed by a drying of the applied adhesive using a drying agent;

optionally crosslinking dried adhesive-treated collective filament or filaments and;

optionally texturing the filament or filaments or strands containing them, wherein: the moderated air resulting from the secondary heat exchanger is employed during conversion of the molten glass into the glass fiber product in at least one of the following stages:
during the attenuation of the at least one stream in the form of one or more attenuation gas currents,
during the sizing of the filament or filaments upstream of their collection in the form of a spraying agent for a sizing agent,
during application of adhesive to the filament or filaments before or after their collection in the form of a spraying agent for an adhesive binder, during the drying of the filament or filaments by using the moderated air as the drying agent, and during the texturing of the filament or filaments or the strands containing them in the form of a texturing gas current.

2. The process of claim 1, wherein the moderated air resulting from the secondary heat exchanger is used during the attenuation of the at least one stream in the form of one or more attenuation gas currents.

3. The process of claim 2, wherein the attenuation is a flame attenuation using an attenuation flame generated by combustion of a fuel with the moderated air resulting from the secondary heat exchanger.

4. The process of claim 2, wherein the attenuation is a gas attenuation using an attenuation gas jet generated by combustion of a fuel with the moderated air resulting from the secondary heat exchanger.

5. The process of claim 4, wherein the attenuation is a centrifugal attenuation followed by a gas attenuation with an attenuation gas jet generated by combustion of a fuel with the moderated air resulting from the secondary heat exchanger.

6. The process of claim 1, wherein the glass fiber product is chosen from reinforcing fibers or strands, textile or reinforcing fabrics, acoustic insulation products, thermal insulation products and fire-protection products.

7. A plant comprising a glass melting furnace and a conversion unit for conversion of molten glass into a glass fiber product, comprising:
a melting furnace comprising a molten glass outlet, an outlet for flue gases and at least one burner for combustion of a gaseous fuel with a rich oxidizer having an oxygen content of 80 vol % to 100 vol %;
a conversion unit comprising:
a bushing adapted and configured for spinning of the molten glass resulting from the melting furnace into at least one stream, said bushing being fluidically connected to the molten glass outlet of the melting furnace;
an attenuation device adapted and configured for attenuation of the at least one stream resulting from the bushing into one or more filaments;
a collector adapted and configured for collecting of the filament or filaments resulting from the attenuation device;
optionally, one or more of a sizer adapted and configured for sizing of the filament or filaments upstream of the collector;
optionally, a dryer adapted and configured for drying of the filament or filaments upstream of the collector;
optionally, an adhesive applicator adapted and configured for application of adhesive to the filament or filaments, the adhesive being a binder, wherein when the dryer and the adhesive applicator are present, the adhesive applicator is disposed upstream thereof;
optionally, a crosslinking chamber that is adapted and configured for crosslinking of the adhesive-treated collected filament or filaments, wherein when the dryer and the crosslinking chamber are present, the crosslinking chamber is disposed downstream thereof; and
optionally, a texturing chamber adapted and configured for texturing of the filament or filaments or of strands containing it;
a primary heat exchanger that is fluidically connected to a source of air and that is adapted and configured to heat air by heat exchange between air and the flue gases discharged from the melting furnace, thereby obtaining hot air, the hot air at a temperature between 500° C. and 800° C.; and
a secondary heat exchanger adapted and configured to preheat the rich oxidizer and/or the gaseous fuel by heat exchange between the hot air and the corresponding rich oxidizer and/or gaseous fuel prior to combustion of the rich oxidizer and the fuel at the at least one burner to produce moderated air, that is obtained from the hot air and also preheated rich oxidizer and/or preheated gaseous fuel, the primary heat exchanger being fluidically connected to the flue gas outlet of the melting furnace and the secondary heat exchanger connected to a source or sources of the rich oxidizer and gaseous fuel, the moderated air being obtained from a moderated air outlet of the secondary heat exchanger;
wherein the moderated air is used in one or more of:
the attenuation device in which case the moderated air is combusted in an attenuation flame or is instead used as an attenuation gas current;
the sizer in which case the moderated air is used as a spraying agent for a sizing agent;
the dryer in which case the moderated air is used as a drying agent in contact with the filament or filaments after application of the adhesive to the filament or filaments by the adhesive applicator;
the adhesive applicator in which case the moderated air is used as a spraying agent for the binder; and
the texturing chamber in which case the moderated air is used for generating a texturing gas current.

8. The plant of claim 7, wherein the moderated air outlet is fluidically connected to the attenuation device for the production of an attenuation flame or of an attenuation gas current.

9. The plant of claim 7, wherein the attenuation device comprises an attenuation burner fluidically connected to the moderated air outlet for the preparation of an attenuation gas current or for combustion of a fuel with the moderated air resulting from the secondary exchanger at the attenuation burner.

10. The plant of claim 9, wherein the attenuation device also comprises a centrifuge, the attenuation burner being annular and capable of generating an attenuation gas current around the centrifuge.

11. The plant of claim 7, comprising a hood surrounding the attenuation device, said hood optionally also surrounding one or more of the sizer, the dryer and the adhesive applicator.

* * * * *